United States Patent [19]

Sakakibara et al.

[11] 4,193,421

[45] Mar. 18, 1980

[54] ELECTROMAGNETICALLY OPERATED VALVE UNIT

[75] Inventors: Naoji Sakakibara, Chiryu; Nobuyuki Hashimoto, Toyota, both of Japan

[73] Assignee: Aisin Seiki Kabushiki Kaisha, Kariya, Japan

[21] Appl. No.: 904,371

[22] Filed: May 10, 1978

[30] Foreign Application Priority Data

May 12, 1977 [JP] Japan ................................. 52-60240

[51] Int. Cl.² ............................................. F16K 31/08
[52] U.S. Cl. ................................. 137/625.33; 251/129; 251/301; 251/303
[58] Field of Search ....................... 251/129, 301, 303; 137/625.65, 625.33

[56] References Cited

U.S. PATENT DOCUMENTS 3,099,280 7/1963 Holzbock ................. 137/625.65 X
3,984,745 10/1976 Minalga .............................. 318/567

Primary Examiner—Arnold Rosenthal
Attorney, Agent, or Firm—Oblon, Fisher, Spivak, McClelland & Maier

[57] ABSTRACT

In an electromagnetically operated valve unit, a moving-coil linear motor is associated with a flow regulating valve to linearly control the quantity of fluid flow in proportion to an input current applied thereto.

2 Claims, 5 Drawing Figures

ELECTROMAGNETICALLY OPERATED VALVE UNIT

BACKGROUND OF THE INVENTION

The present invention relates to an electromagnetically operated valve unit of the type in which a flow regulating valve is operated in response to an input current from an electric control circuit.

SUMMARY OF THE INVENTION

A primary object of the present invention is to provide an improved electromagnetically operated valve unit in which a moving-coil linear motor is associated with a flow regulating valve to linearly control the quantity of fluid flow in proportion to an input current applied thereto.

Another object of the present invention is to provide an improved electromagnetically operated valve unit, having the above-mentioned characteristics, capable of controlling the quantity of fluid flow in a wider range.

According to the present invention, there is provided an electromagnetically operated valve unit comprising a housing having inlet and outlet ports, valve means disposed within the housing for controlling the quantity of fluid flow from the inlet port to the outlet port, and a moving-coil linear motor associated with the valve means for operating the valve means in response to an input current from an electric control circuit. The valve means includes a valve seat arranged between the inlet and outlet ports and having an elongated opening to permit the flow of fluid therethrough, and a valve member co-operating with the valve seat to control the opening area of the valve seat, and the linear motor comprises an armature of magnetic material secured within the housing and having opposed inner faces thereon, a pair of permanent magnets secured to each of the opposed inner faces of the armature and having the same polarity of the opposed inner faces thereof, a core of magnetic material positioned between the magnets, a bobbin of non-magnetic material movable on the magnetic core and operatively connected with the valve member, and a moving-coil wound on the bobbin and connected to the electric control circuit, the moving-coil producing electro-magnetic flux across magnetic flux of the magnets to provide a linear force on the bobbin.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
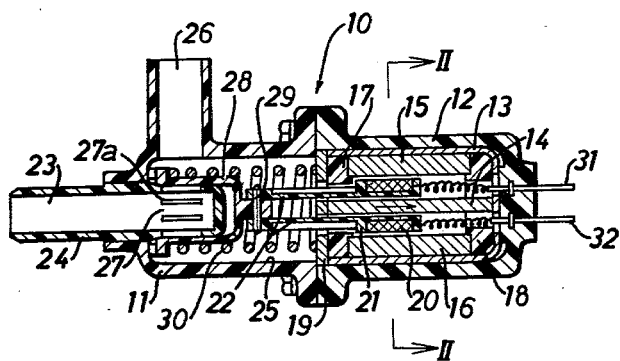
FIG. 1 is a sectional view of an electromagnetically operated valve unit in accordance with the present invention.
Figure 2:
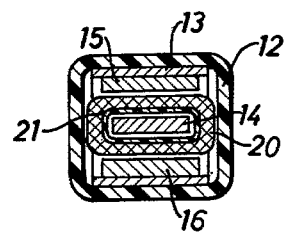
FIG. 2 illustrates a cross-section taken along line II—II of FIG. 1.

In FIGS. 1 and 2 of the drawings, there is illustrated on electromagnetically operated valve unit 10 in accordance with the present invention in which a moving-coil linear motor is adapted to operate a flow regulating valve. The valve unit 10 has two housing sections 11 and 12 made of synthetic resin material which are hermetically secured to each other by screws. The linear motor is assembled within the housing section 12 and comprises a U-shaped armature 13 of magnetic material coupled within the housing section 12 and secured in place by means of a cover plate 19. A pair of permanent magnets 15 and 16 are secured to each of the opposed inner faces of the armature 13 and positioned in place by means of a pair of guide members 17 and 18 made of synthetic resin material. These permanent magnets 15 and 16 are magnetized to provide the same polarity of the opposed inner faces thereof. A core of magnetic material 14 is positioned centrally between the magnets 15 and 16 and is secured between the cover plate 19 and the bottom of the armature 13. The magnetic core 14 provides both a flux return path and a guide on which is slidably mounted a bobbin 21 carrying a winding 20. The bobbin 21 is made of insulating material such as synthetic resin and is formed with a pair of legs 22 which extend into a interior chamber 25 of the housing section 11 through the cover plate 19 and the guide member 17. The winding 20 has input terminals 31 and 32 which are connected to receive a control current from an electric control circuit (not shown).

With the moving-coil linear motor, magnetic fluxes in the form of a closed-loop are provided by the magnets 15 and 16 across the armature 13 and the core 14. When a control current is applied to the winding 20 through the terminals 31 and 32, a linear force indicated by an arrow in FIG. 1 is produced in proportion to the current in the winding 20 by Fleming's right-hand rule. The linear force may be reversed in direction by reversing the voltage polarity. In addition, the linear force is represented by an equation described below.

$$F = I \times Bg \times L$$

where the linear force is indicated by F, the current in the winding 20 is indicated by I, the density of gap flux is indicated by Bg, and the effective length of the winding 20 is indicated by L. From the equation, it is noted that the linear force F is proportional only to the current applied to the winding 20 because of constant values of Bg and L.

The housing section 11 is provided with a nipple 24 which is secured to the side wall of the housing 11 coaxially with the bobbin 21. The nipple 24 is formed with an inlet port 23 and a tubular valve seat portion 27 with a closed end. The valve seat portion 27 is provided with a plurality of axial slots 27a opening into the interior chamber 25. The housing section 11 is also provided with an outlet port 26 which is communicated into the inlet port 23 through the interior chamber 25 and the axial slots 27a of the nipple 24. A cup-shaped slide valve member 28 is slidable on the valve seat portion 27 and is connected to the legs 22 of the bobbin 21 by a pin 29. A compression coil spring 30 is disposed between the cover plate 19 and an annular flange of the valve member 28 to bias the valve member 28 in a leftward direction. Thus, the axial slots 27a of valve seat 27 are normally closed by the slide valve member 28 due to biasing force of the spring 30.

Figure 3:
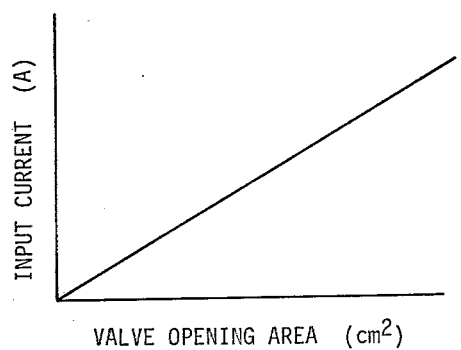
FIG. 3 is a graph showing a relationship between valve opening area and input current.

In operation of the electromagnetically operated valve unit 10, when the winding 20 receives a control current thereto, the valve member 28 is moved by a linear force produced on the bobbin 21 against the spring 30 to open the axial slots 27a. This permits the flow of fluid from the inlet port 23 to the outlet port 26. Thus, the flow quantity of fluid is controlled by movement of the valve member 28, which movement is proportional to the current in the winding, as described above. It is therefore evident that the effective opening area of the axial slots 27a is linearly controlled in accordance with variation of the control current in the winding 20, as illustrated in FIG. 3.

Figure 4:
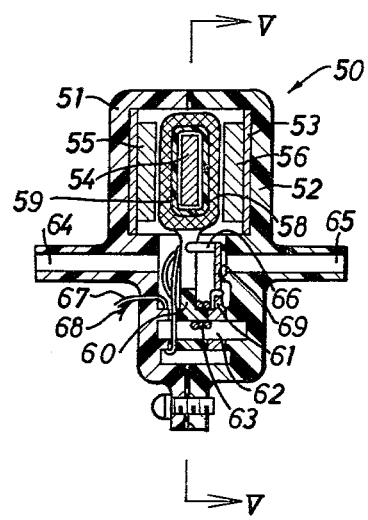
FIG. 4 is a sectional view of a modified valve unit of the present invention.
Figure 5:
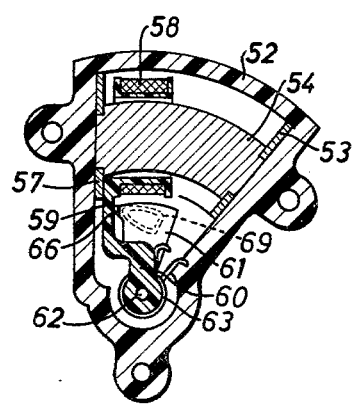
FIG. 5 illustrates a cross-section taken along line V—V of FIG. 4.

In FIGS. 4 and 5, there is illustrated a modified valve unit 50 of the present invention wherein housing sections 51 and 52 are provided with inlet and outlet ports 64 and 65 respectively. The housing sections 51 and 52 are secured to each other by screws to form an interior chamber therein. Within the housing sections, a U-shaped armature 53 of magnetic material is secured in place by means of a cover plate 57. A pair of permanent magnets 55 and 56 are shaped in a semi-circular fashion and secured to each of the opposed inner faces of the armature 53. These magnets 55 and 56 are magnetized to provide the same polarity of the opposed inner faces thereof. A core of magnetic material 54 is also shaped in a semi-circular fashion and positioned centrally between the magnets 55 and 56. The magnetic core 54 is further secured in place between the cover plate 57 and the bottom of the armature 53 and provides both a flux return path and a guide on which is slidably mounted a bobbin 59 carrying a winding 58. The bobbin 59 is made of insulating material and is formed with a leg 60 which is pivoted on a lateral pin 62. The lateral pin 62 is fixed at its opposite ends to the housing sections 51 and 52 and serves to pivot a valve member 61 thereon. A spiral spring 63 is engaged at one end thereof with the valve member 61 and at the other end thereof with a portion of the housing section 52 to normally bias the valve member 61 in a leftward direction. Thus, the valve member 61 is resiliently engaged at 66 with the leg 60 of bobbin 59 and normally closes an elongated opening of a valve seat 69, which is provided at the inner end of the outlet port 65. The opening area of the valve seat 69 becomes larger in a rightward direction. Additionally, the winding 58 has input terminals 67 and 68 which are connected to receive a control current from an electric control circuit (not shown).

In operation of the modified valve unit 50, when the winding 58 receives a control current from the control circuit, the bobbin 59 rotates clockwise to rotate the valve member 61 in the same direction against the spring 63. This opens the valve seat 69 to permit the flow of fluid from the inlet port 64 to the outlet port 65. Thus, the flow quantity of fluid is linearly controlled by rotary movement of the valve member 61, which rotary movement is proportional to the current in winding 58.

In an actual practice of the present invention, the electromagnetically operated valve units 10 and 50 may be adapted to control an amount of air sucked into an internal combustion engine in idling operation. In this instance, the winding 20 or 58 of the valve units is connected to an electronic control circuit which is designed to issue a control current in accordance with various input signals from a thermo sensor, a flow meter, a rotation speed sensor and the like.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An electromagnetically operated valve unit comprising a housing having inlet and outlet ports; valve means disposed within said housing for controlling the quantity of fluid flow from said inlet port to said outlet port; and a moving-coil linear motor associated with said valve means for operating said valve means in response to an input current from an electric control circuit; wherein said valve means comprises a tubular valve seat united with said inlet port and having an axial slot to permit the flow of fluid therethrough, and a cup-shaped valve member slidable on said tubular valve seat to control the opening area of said axial slot and being loaded by a spring to normally close said axial slot, and wherein said linear motor comprises an armature of magnetic material secured within said housing and having opposed inner faces thereon, a pair of permanent magnets secured to each of the opposed inner faces of said armature and having the same polarity of the opposed inner faces thereof, a core of magnetic material positioned between said magnets and aligned with said inlet port, a bobbin of non-magnetic material movable on said magnetic core and operatively connected with said valve member, and a moving-coil wound on said bobbin and connected to said electric control circuit, said moving-coil producing electromagnetic flux across magnetic flux of said magnets to provide a linear force on said bobbin.

2. An electromagnetically operated valve unit comprising a housing having inlet and outlet ports; valve means disposed within said housing for controlling the quantity of fluid flow from said inlet port to said outlet port; and a moving-coil linear motor associated with said valve means for operating said valve means in response to an input current from an electric control circuit; wherein said valve means comprises a valve seat arranged between said inlet and outlet ports and having an elongated opening to permit the flow of fluid therethrough, and a valve member pivoted on a portion of said housing to control the opening area of said valve seat and being loaded by a spring to normally close the elongated opening of said valve seat, and wherein said linear motor comprises an armature of magnetic material secured within said housing and having opposed inner faces thereon, a pair of permanent magnets secured to each of the opposed inner faces of said armature and having the same polarity of the opposed inner faces thereof, a core of magnetic material shaped in a semi-circular fashion and positioned between said magnets, a bobbin of non-magnetic material movable on said magnetic core and having a leg portion pivoted coaxially with said valve member, said bobbin being engaged at its leg portion with said valve member, and a moving-coil wound on said bobbin and connected to said electric control circuit, said moving-coil producing electromagnetic flux across magnetic flux of said magnets to provide a linear force on said bobbin.

* * * * *